United States Patent [19]

Richards

[11] Patent Number: 5,364,426

[45] Date of Patent: Nov. 15, 1994

[54] HIGH SHEAR MIXER AND GLASS MELTING METHOD

[75] Inventor: Ray S. Richards, Sylvania, Ohio

[73] Assignee: Stir-Melter, Inc., Perrysburg, Ohio

[21] Appl. No.: 122,914

[22] Filed: Sep. 16, 1993

Related U.S. Application Data

[62] Division of Ser. No. 862,328, Apr. 2, 1992, Pat. No. 5,273,567, which is a division of Ser. No. 665,894, Mar. 7, 1991, Pat. No. 5,120,342.

[51] Int. Cl.⁵ .................................. C03B 5/027
[52] U.S. Cl. ........................... 65/474; 65/27178; 65/33.9; 65/135.3; 65/135.6; 65/134.5
[58] Field of Search ............... 65/2, 27, 28, 134–136, 65/178

[56] References Cited

U.S. PATENT DOCUMENTS

| | | | |
|---|---|---|---|
| 1,267,317 | 5/1918 | Erskine . | |
| 1,603,221 | 10/1926 | Thomson . | |
| 1,898,039 | 2/1933 | Eckert . | |
| 2,520,577 | 8/1950 | Tooley . | |
| 2,569,459 | 10/1951 | De Voe . | |
| 2,641,454 | 6/1953 | Labino | 259/8 |
| 2,707,621 | 5/1955 | Peiler | 259/6 |
| 2,716,023 | 8/1955 | Cleveland | 259/6 |
| 2,762,167 | 9/1956 | De Voe . | |
| 2,859,261 | 11/1958 | Arbeit . | |
| 2,871,000 | 1/1959 | Dowling | 259/4 |
| 2,982,522 | 5/1961 | Hamilton et al. | 257/104 |
| 2,993,079 | 7/1961 | Augsburger . | |
| 3,020,324 | 2/1962 | Curtis . | |
| 3,057,175 | 10/1962 | Rough et al. | 65/178 |
| 3,109,045 | 10/1963 | Silverman . | |
| 3,231,351 | 1/1966 | Brichard | 65/85 |
| 3,236,618 | 2/1966 | Allman | 65/178 |
| 3,244,493 | 4/1966 | Cala | 65/134 |
| 3,268,213 | 8/1966 | Cala | 259/7 |
| 3,268,320 | 8/1966 | Penberthy | 65/178 |
| 3,350,187 | 10/1967 | Brichard et al. | 65/134 |
| 3,352,659 | 11/1967 | Rahe | 65/178 |
| 3,358,066 | 12/1967 | Tiede et al. . | |
| 3,359,090 | 12/1967 | Hynd | 65/178 |
| 3,364,042 | 1/1968 | Swain et al. | 106/52 |
| 3,520,979 | 7/1970 | Scarfe et al. . | |
| 3,535,268 | 10/1970 | Monks et al. . | |
| 3,539,691 | 11/1970 | Lucek . | |
| 3,819,350 | 6/1974 | Pellett et al. | 65/134 |
| 3,850,606 | 11/1974 | Rough | 65/178 |
| 3,883,340 | 5/1975 | French et al. | 65/134 |
| 3,926,607 | 12/1975 | Pellett | 65/136 |
| 3,929,445 | 12/1975 | Zippe | 65/335 |
| 3,942,968 | 3/1976 | Pieper | 65/134 |
| 3,951,635 | 4/1976 | Rough, Sr. | 65/135 |
| 3,988,138 | 10/1976 | Rough | 65/134 |
| 3,997,315 | 12/1976 | Rhodes et al. | 65/135 |
| 4,004,902 | 1/1977 | Pieper | 65/134 |
| 4,007,027 | 2/1977 | Froberg | 65/136 |
| 4,029,488 | 6/1977 | Rhett | 65/136 |
| 4,029,489 | 6/1977 | Froberg et al. | 65/136 |
| 4,047,918 | 9/1977 | Heithoff | 65/179 |
| 4,139,360 | 2/1979 | Piper | 65/134 |
| 4,309,204 | 1/1982 | Brooks | 65/28 |
| 4,325,724 | 4/1982 | Froberg | 65/121 |
| 4,339,261 | 7/1982 | Walton et al. | 65/178 |

(List continued on next page.)

FOREIGN PATENT DOCUMENTS

| | | | |
|---|---|---|---|
| 704913 | 12/1979 | U.S.S.R. | 65/178 |
| 1135717 | 1/1985 | U.S.S.R. | 65/178 |
| 1137089 | 1/1985 | U.S.S.R. | 65/178 |
| 1184819 | 10/1985 | U.S.S.R. | 65/178 |

Primary Examiner—Robert L. Lindsay
Attorney, Agent, or Firm—Brooks & Kushman

[57] ABSTRACT

A glass melter 30 having a mixing impeller 34 for converting a feed stream 38 supplied to a vessel 32 into a vitrified glass melt 50. Heating means such as electrodes 36 or a gas burner 58 are used to heat the glass melt 50. Electrode 36 arrangements are proposed for minimizing current flow through the impeller 34. Current flow through a special continuous circular impeller or conical pump 70 is disclosed. A cylindrical vessel 98, triangular vessel 94, square vessel 32, and hexagonal vessel 96 are disclosed. Methods of processing particular waste streams are disclosed including coated mineral fibers, fly ash, radioactive material, chemical waste and the like.

13 Claims, 7 Drawing Sheets

U.S. PATENT DOCUMENTS

| | | | |
|---|---|---|---|
| 4,385,918 | 5/1983 | Dunn et al. | 65/27 |
| 4,422,862 | 12/1983 | Wardlaw | 65/28 |
| 4,426,217 | 1/1984 | Farrar et al. | 65/135 |
| 4,432,780 | 2/1984 | Propster et al. | 65/2 |
| 4,493,557 | 1/1985 | Nayak et al. | 366/300 |
| 4,592,723 | 6/1986 | Seng | 65/27 X |
| 4,666,490 | 5/1987 | Drake | 65/27 |
| 4,678,493 | 7/1987 | Roberts | 65/27 |
| 4,744,809 | 5/1988 | Pecoraro et al. | 65/135 |
| 4,780,121 | 10/1988 | Matesa | 65/134 |
| 4,798,616 | 1/1989 | Knavish et al. | 65/135 |
| 4,820,328 | 4/1989 | Roberts | 65/27 |
| 4,820,329 | 4/1989 | Gunthner | 65/134 |
| 4,875,917 | 10/1989 | Lentz | 65/3.11 |

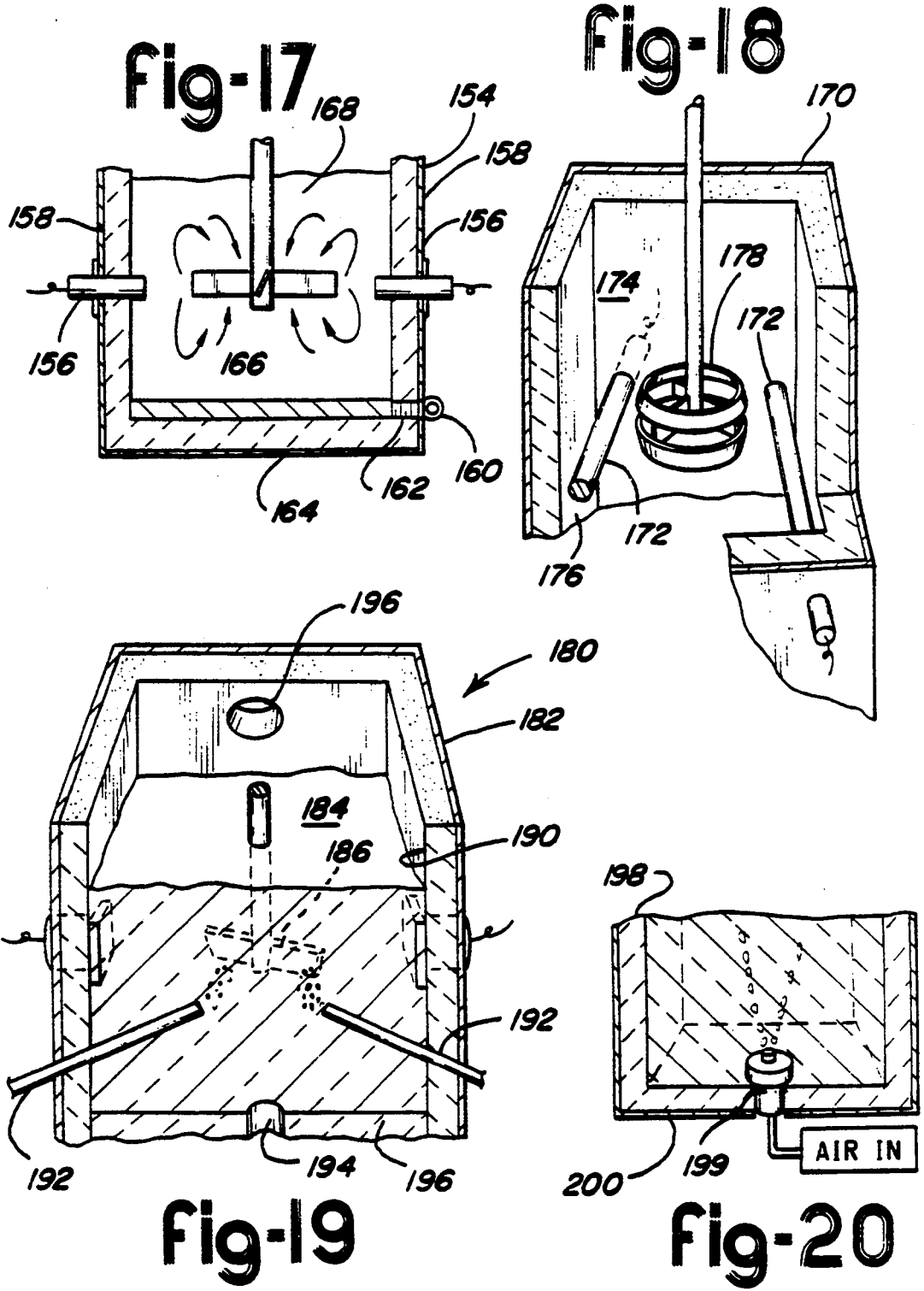

HIGH SHEAR MIXER AND GLASS MELTING METHOD

This is a divisional of copending application(s) Ser. No. 07/862,328 filed on Apr. 2, 1992, now U.S. Pat. No. 5,273,567 and Ser. No. 07/665,894 filed on Mar. 7, 1991, now U.S. Pat. No. 5,120,342.

TECHNICAL FIELD

The present invention relates to glass melting methods and apparatus and more particularly relates to glass melting apparatus having a highly stirred portion of the melt volume.

BACKGROUND OF INVENTION

Vitrification holds promise as an approach to disposing of hazardous wastes and recycling glass manufacturing scrap. In the manufacture of glass, vitrifiable material is heated to its melting point and then cooled to form glass.

Conventional glass-making furnaces are large refractory lined tanks using direct heat from gas burned in the furnace above the upper surface of a pool of molten glass. Electric glass furnaces have also been developed which heat vitrifiable material by application of electrical energy through the material which is commonly referred to as Joule effect heating. Fluid flow in such furnace is primarily convective flow. In either gas fired or electrically heated glass-making furnaces, only limited agitation, if any, of the glass bath is permitted so as to minimize formation of bubbles in the glass. Bubbles are generally undesirable in finished glass products.

In the early 1970's, Owens-Illinois developed a three step rapid melting refining system described in U.S. Pat. Nos. 3,850,606; 3,654,886; 3,988,138 and 3,819,350. This rapid melting refining system project is summarized in an article entitled "Rapid Melting and Refining System", Ray S. Richards, Ceramic Bulletin, Volume 67, Number 11, 1988 Page 1,806. In the rapid melting refining system, the glass-making process was divided into three separate steps. Special machinery was designed for heating glass to melt batch material in a first step, homogenizing glass to remove sand grains and seeds in a second step and refining the glass mix by the removal of seeds and bubbles by centrifuging in a third step.

The Owens-Illinois system was directed to the manufacture of glass used in making containers and the like. The rapid melting system achieves an equivalent melting capacity of a conventional cold top electric melter with only ten to fifteen per cent of the melt area required by the conventional melter. The smaller melter size and lower temperatures reduce vitalization and heat losses. In addition, the size and cost of air pollution control equipment may be reduced. Lower average temperatures for maintaining a glass melt in molten condition of 100° to 200° F. are achieved because a uniform integral glass temperature is maintained. These advantages of the rapid melting process for recycling or vitrification were not recognized by the trade prior to this invention. The 1988 Richards article presented the results of the earlier work and proposed adaptation of the Owens-Illinois process for vitrification of hazardous waste material including low-level radioactive waste, municipal incinerator waste and asbestos waste material. However, an apparatus and method for implementing that proposed process had not been attempted and was not disclosed or suggested in the 1988 Richards article.

The Owens-Illinois system employed the impeller of the mixing device as a primary electrode for Joule-effect heating. Current concentration at the tips of the impeller and the use of single phase power limited scale up of the Owens-Illinois melter. The problems related to converting the melting and refining system proposed by Owens-Illinois to vitrification of hazardous waste material and recycling are addressed by the present invention. The present invention also addresses some of the unsolved problems which were encountered by the rapid melting and refining system referred to above.

The primary problems associated with conventional gas and Joule heated molters is their large size and cost, expensive air pollution control equipment, energy costs, their need for continuous uninterrupted production and their inability to change production rates significantly without quality upsets.

Another kind of problem encountered in conventional glass-making or vitrification processes can be categorized in part by reference to the feed stream supplied to the glass melting furnace. The conventional feed stream for the glass-making process includes "raw batch" and may also include cullet such as recycled bottles, glass beads, specialty glasses, window glass or glass foam. "Raw batch" may also include mixtures of silica, alkali and stabilizing ingredients such as lime, alumina, lead and barium. A primary problem associated with processing such feed streams is segregation and subsequent homogeneity control. Another problem with prior art systems is that pre-blended batch can only be pre-heated to a limited extent without it adhering to and blocking equipment.

It would be desirable to recycle scrap from mineral wool production. Fiberglass scrap may have up to fifteen per cent organic binder. When this scrap is added to conventional melters, carbon residue from organic binders in the scrap is trapped in the melt and creates an unacceptable black glass. Scrap mineral fibers are lightweight and tend to float on the surface of the glass melt where they obstruct heat transfer. Light-weight feed streams also can be carried out of the furnace in the exhaust gas stream.

Fly ash and bottom ash from incinerators generally referred to as ash, may include highly toxic material which can be made resistant to leaching by vitrification in a glass melting furnace. Fly ash presents problems which are in some respects similar to problems faced in recycling scrap mineral fibers, in that a light-weight, low density feed stream must be introduced into the glass melt. An additional problem relating to the vitrification of ash is that ash changes composition depending upon the source of ash and the constituents of the waste incinerated. For example, in the fall of the year a large volume of organic waste from leaf disposal is processed in municipal waste incinerators. This change in composition of the ash may require modification of the chemical constituents supplied to the glass melt in addition to the ash. Fly ash also presents special problems due to its toxicity which creates handling problems.

Radioactive wastes may be in the form of a liquid slurry or dry waste. Radioactive waste can further be divided into high-level, intermediate and low-level radioactive waste. Another radioactive waste stream is contaminated earth. A problem associated with vitrification of radioactive waste is handling radioactive material in a safe manner. Some radioactive waste streams include absorbent pads used to absorb minor spills of contaminated material at radioactive sites. One problem associated with the disposal of absorbent pads is the large volume of organic material used to absorb a small amount of radioactive material which exacerbates waste disposal problems.

Industrial waste feed streams including these from plating, painting and other industrial waste present special waste disposal problems which can be addressed by vitrification. Toxic inorganic substances found in chemical and industrial waste streams may be disposed of with excellent leach resistance when vitrified. Problems relating to chemical industry waste include disposal of incinerator bottom and fly ash. Bottom ash may include a considerable volume of metal which can interfere with Joule effect heating.

It is anticipated that other feed streams, including but not limited to asbestos and refractory fibers, may be processed by vitrification and problems associated therewith may be solved by applicant's invention as summarized below.

DISCLOSURE OF INVENTION

A general form of a vitrification apparatus, made in accordance with the invention for processing one or more of the above feed streams, comprises a vessel having an opening above the melt for receiving feed material which is converted into molten vitreous material in the vessel. The vessel has an outlet pert for removing molten vitreous material from the vessel. An impeller is provided in the vessel to mix feed material and molten vitreous material within the vessel. A plurality of electrodes are disposed in the vessel and electrical energy is passed from one electrode to another through the feed material and molten vitreous material in the vessel. Several novel concepts involve the operation of the impeller as it acts upon the molten vitreous material and feed material.

The impeller functions to mix the molten vitreous material and feed material. The impeller may also mix the feed material and molten vitreous material with the atmosphere above the molten vitreous material. Variables relating to the impeller function relate to the type of impeller selected whether radial, axial, conical, etc. The number of blades provided on the impeller, the pitch of the blades, size and angle of the conical impeller and the depth at which the impeller is rotated in the molten material all affect impeller function. Speed of rotation of the impeller and impeller shaft angulation also affect operation.

The atmosphere above the molten bath is preferably of a controlled oxidation state. For instance, if it desirable to oxidize feed material constituents, an oxidizing atmosphere may be maintained in the vessel. A slightly negative gas pressure may be maintained in the vessel to draw off gases from the feed material and molten vitreous material as they are mixed. Hazardous gases also may be controlled by providing negative pressure in the vessel. Gas pressure, significantly below atmospheric, can be used to remove gases from the melt. A reducing atmosphere or inert atmosphere may be maintained in the vessel to inhibit oxidation of the impeller or other component parts of the apparatus, to produce reduced melts or to control glass chemistry.

The mixing mode of the impeller co-operates with the composition of the atmosphere in the apparatus to process molten vitreous material. The rate of interaction with the atmosphere in the vessel can be modified by the mixing mode. The impeller can also be used to draw feed material down into the molten vitreous material at a controlled rate to facilitate oxidization or other reactions on the surface of the bath, or at a rapid rate to maximize feed rate. The impeller can be used to lift molten vitreous material over feed material to submerge feed material in the vessel. Light-weight feed material may be submerged by the mixing action of the impeller wherein vitreous material is caused to engulf feed material as it is added. Two or more impellets may be used to improve mixing rates or draw down of feed material.

In one embodiment, the impeller can be a cone shaped centrifugal element which is rotated to pump molten vitreous material upward into the atmosphere in a manner similar to a sprinkler. This mixing mode maximizes surface contact with the atmosphere in the vessel and also allows for swamping of feed material. A conventional impeller disposed partially submerged in the molten vitreous material can turbulently mix molten vitreous material with feed material and may also function in a sprinkler fashion. The height can also be changed to cause the impeller to spray glass above the surface of the melt or clear sludge accumulations from the bottom of a vessel. The height of the impeller in the molten vitreous material can be adjusted upwardly and downwardly to alter the density of the glass output.

Impeller composition is matched to the atmosphere in the vessel. For instance, a molybdenum impeller may be selected for operation in a submerged melt of many glasses regardless of the oxidation state of the atmosphere. If a molybdenum impeller is used in a melter with an oxidizing atmosphere, the molybdenum will oxidize if the impeller becomes exposed to the atmosphere through either the drawing down of atmosphere into the bath or by operating the impeller in a partially submerged mode. Consequently, it is preferable to operate a molybdenum impeller in a reducing or inert atmosphere if contact with the molybdenum impeller is made by the atmosphere.

The impeller may also include cooling/circulation means to prevent oxidation of the impeller. A cooling medium may be circulated partially or fully through the impeller shaft and impeller blades depending upon the requirements of an application.

According to another aspect of the invention, the apparatus for vitrifying feed material may include a refractory vessel having a plurality of electrodes disposed in the vessel and arrayed about the impeller. The electrodes are disposed in the vessel to minimize the current flow through the walls of the refractory and the impeller. A refractory vessel generally will include a refractory top cover which defines a controlled atmosphere space within the vessel above the surface of the melt.

In one embodiment, the top cover includes means for receiving electrode receptacles. The electrodes may be shielded if necessary to prevent degradation of the electrodes above the surface of the melt. Refractory walls preferably have alumina/zirconia/silica refractory bricks or chrome oxide refractory bricks having known electrical resistance. Other refractories may be selected, dependent upon the composition of the glass being melted. The electrodes are spaced from the bricks sufficiently to minimize current flow through the bricks. The electrodes are also positioned to minimize current flowing through the impeller. Refractory vessels are also advantageously used in vitrification of feed streams containing constituents which are highly oxidizing.

Lead oxide, water and hydrated sodium tetraborate are examples of such oxidizing constituents.

According to another aspect of the invention, a vessel is provided for vitrifying feed material wherein feed material is received in an opening above the surface of the melt of the vessel and converted into molten vitreous material. After conversion into a molten vitreous state, the material can be removed from the vessel through an outlet port. An impeller disposed in the vessel mixes feed material and the molten vitreous material and includes a plurality of blades. A plurality of electrodes are disposed in the vessel for passing electrical energy from one electrode to another through the feed material and molten vitreous material in said vessel.

According to one aspect of the invention, the number of electrodes is selected and the electrodes are arranged to minimize passage of current through the impeller. This factor is more important as the size of the impeller increases relative to the spacing between electrodes of differing phase. The drive shaft of the impeller is electrically isolated from the heating circuit. This may be accomplished by isolating the shaft and impeller from ground.

In a preferred mode of the invention a three phase electrical current is provided to the vessel through a multiple of three electrodes wherein the number of blades corresponds to the number of multiples of three electrodes provided. For example, a system having a large two bladed impeller would have six electrodes arrayed so that when the impeller rotates, the two blades of the impeller are aligned with electrode pairs of identical phase. Similarly, a vessel having nine electrodes and a three bladed impeller may be provided wherein sets of three electrodes of identical phase are aligned with the three blades of the impeller simultaneously.

If it is desirable to use single phase electrical current, four electrodes may be provided with an impeller having two or three blades. Two blades provide the best electrical performance, however, three blades are better for mixing and are better than four blades electrically. A three bladed impeller can be used with four electrodes which are arrayed so that the three blades of the impeller are not aligned with any two electrodes at any time. A single-phase electrical current can be provided to two electrodes with an impeller having three blades when the two electrodes are arrayed so that two of the three blades are not aligned with any two electrodes at any time.

In another aspect of the invention, the apparatus for vitrifying feed material may comprise a vessel and an impeller as previously described wherein single phase electrical current is provided. An electrically conductive vessel may be provided to function as a first electrode with the impeller functioning as a second electrode. Constant spacing is maintained between the first and second electrodes. In this embodiment, the impeller may be a frustoconical member having a first opening and a second opening smaller than the second opening. The first and second openings are aligned with a vertical axis of rotation of the frustoconical member wherein the smaller opening is submerged in the molten vitreous material. Alternatively, the orientation of the first and second openings may be reversed with the impeller being submerged.

The apparatus for vitrifying the feed material of the invention may also be defined as a vessel in which feed material is converted into molten vitreous material, including an impeller for mixing and a plurality of electrodes disposed in the vessel. The electrodes are arranged to minimize the passage of current through the impeller.

Another aspect of the present invention relates to a vessel having first and second outlet ports. The first outlet port is provided to remove vitreous material from the vessel. The second outlet port in the vessel located below the first outlet port is provided to remove reduced metallic material or other heavy material from the vessel. Additional outlet ports may be added if desired.

To accommodate various feed streams having a variable composition, the invention may be modified to respond to measurement means for assaying the chemical composition of the feed stream. In particular, regarding the application of the process to vitrifying municipal incinerator ashes, or other hazardous waste streams which have considerable variability in their composition, the apparatus may include measurement means for assaying chemical composition of the material to be vitrified. A supply system may also be provided for adding glass formers, glass modifiers and fluxing agents to the vessel in response to the output of the measurement means to assure manufacture of acceptable vitrified output. The glass formers, glass modifiers and fluxing agents could be added to the melt either prior to supplying the feed stream to the melt, or after the feed stream has been received in the vessel.

According to another aspect of the invention, the feed stream supplied to the vessel may be pre-processed by incineration and supplying the resulting ashes to the vessel. Some hazardous material can also be processed directly by vitrification of the hazardous material without incineration. When processing hazardous material, it is preferable to provide negative pressure in the head space of the vessel so that vaporized hazardous material is contained within the melter so that it can be removed and safely processed.

The present invention also relates to various methods which incorporate the use of the mixer/molter to process various feed streams and achieve desired output.

A method of recycling coated mineral fibers such as fiberglass scrap, having an organic coating, may comprise the steps of depositing the coated mineral fibers into a vessel containing a molten glass bath. The molten glass bath is then stirred at a speed sufficient to create surface currents which convey the coated mineral fibers along with the surface currents. The coated mineral fibers are heated while being conveyed by the surface currents to decompose the organic coating on the mineral fibers leaving a carbon residue on the mineral fibers. One portion of the residue is oxidized while the mineral fibers are conveyed by the surface currents while a second portion of the residue is dispersed with the remaining mineral fibers into the molten glass bath to create a carbon contaminated glass melt. Carbon contaminated glass melt may be processed by oxidation, wherein the contaminated glass melt is combined with an oxidizer in the presence of heat to form carbon oxides. Oxidation may be carried out in a second stage.

The oxidizing step may comprise, for example, any of the following reactions:

$$C + O_2 \rightarrow CO_x$$

$$Na_2O + C \rightarrow CO_x + Na$$

$$C + SiO_2 \rightarrow CO + SiO$$

$$C + H_2O \rightarrow CO + H_2$$

The use of other oxidizers such as nitrates and multivalent oxides are also possible.

The oxidizing reaction step can occur either in the primary mixer/melter or in a second stage. In the second stage an oxidizer injector may be used to agitate the bath and assure complete oxidation of the carbon in the carbon contaminated glass melt. The oxidation step can also be facilitated by super-heating the molten glass bath to a temperature greater than 2,500° F. at which point carbon begins to react with sodium compounds in the molten glass bath to form carbon oxides. Similarly, by super-heating the molten glass melt to temperatures greater than 2,650° F. carbon begins to react with silicon compounds in the molten glass bath to form carbon oxides. After oxidation of the carbon contaminated molten glass bath, the molten glass bath is suitable for re-use as feed stock for fiberglass forming operation.

With some feed streams it may be possible to utilize the fuel value of components of the feed stream to provide power for heating the melter. For example, the binder coating on scrap glass fibers contains a considerable quantity of carbon which, when oxidized can provide thermal energy to the melter. The energy provided by the external heat source can be reduced or eliminated as the fuel value of the carbon is used to heat the melt.

Another method of the present invention relates to the vitrification of ash and the toxic and hazardous waste material contained in ash in a mixer/melter. According to the method of vitrifying ash, ash is first deposited into a vessel containing a molten glass bath. Additional glass formers, glass modifiers and fluxing agents can also be added to the molten glass bath to provide an acceptable glass composition for vitrification. The molten glass bath is stirred by an impeller to disperse the ash and glass formers, glass modifiers and fluxing agents throughout the molten glass bath. The molten glass bath is heated to maintain a temperature above the melting point of the molten glass bath. A portion of the molten glass bath is continuously removed from the vessel as additional ash and glass making chemicals are added to the melt, as required. The glass melt, including ash, once vitrified, can be cooled to form aggregate.

Control of the ash vitrification method can be achieved by monitoring emissions from the vessel in the exhaust stack through which gases are released from the vessel. The exhaust stack emissions can be measured to ensure that the exhaust does not exceed predetermined limits for lead, zinc and cadmium. In response to the emissions monitoring step, the combination of glass formers, glass modifiers and fluxing agents may be controlled to minimize emissions. The ash may be pre-mixed with one of the glass formers, glass modifiers or fluxing agents prior to being supplied to the vessel. By mixing ash with other constituents, control of the ash may be obtained and incorporation into the molten glass bath may be achieved.

Exemplary glass formers include the following: $B_2O_3$; $SiO_2$.

Exemplary glass modifiers include the following: MgO; CaO; $Al_2O$.

Exemplary fluxing agents include the following: $Na_2O$; $K_2O$; $Li_2O$.

Another method according to the present invention is a method of vitrifying hazardous material such as radioactive material. The disclosure of U.S. patent application Ser. No. 510,556 filed Apr. 18, 1990 is hereby incorporated by reference. The stir-melter has performed well in the vitrification of simulated radioactive waste where the permanence of dissolution in glass has become the preferred disposal standard for this and other hazardous inorganic material. Fly ash from municipal waste incinerators has been vitrified into a course aggregate, being safe for use as measured by TCLP test for heavy metals leachate.

According to this invention, hazardous material and glass forming constituents may be deposited in a molten glass bath. The organic components of the hazardous material may be burned by injecting an oxidizing agent into the vessel to facilitate combustion of organic components. The oxidized components of the hazardous material are then dispersed into the molten glass bath by an impeller to form a solution in the molten glass bath. Finally, a portion of the molten glass bath is removed from the vessel. An additional step in the process may be the subsequent heating in a second vessel of the portion of the molten glass bath removed. In the second vessel it is preferred that the portion of the glass melt removed be heated to a temperature above that in the first stage. The second stage may be a molten glass bath having no agitation except for convection currents in the bath.

The method of vitrifying material, such as radioactive wastes, may further include the step of supplying glass formers, glass modifiers and fluxing agents to the molten glass bath. The molten glass bath is heated and mixed by an impeller to create a vitrified melt of residue from the radioactive material and the added glass formers, glass modifiers and fluxing agents. The radioactive material supplied to the vessel may be supplied in the form of an aqueous slurry, dry mixture or ether form. The aqueous slurry containing radioactive material may be pre-processed to remove cesium, chlorine or other undesirable components from the slurry.

An additional step in processing material such as radioactive waste may include the step of tapping the vessel at a point spaced above the bottom portion of the vessel leaving a settling zone or trap for dense material which may separate from the melt. The heavy material may then be removed through an additional drain in the bottom of the melter and drawn off after they accumulate in the bottom of the vessel.

Another method according to the present invention, is a method of recycling waste streams having an organic component wherein the waste stream is deposited in the vessel containing a molten glass bath the heat from which pyrolizes and facilitates oxidization of a portion of the organic material by oxidizing agents. The waste stream and residual organic material are dispersed into the molten glass bath by means of stirring the molten glass bath sufficiently to substantially and instantaneously make a waste stream dispersion in the glass bath. The waste stream dispersion is heated to melt the waste stream and pyrolize the residual organic component of the waste stream.

If the small amount of carbon residue in the melt is objectionable, it can be removed to a second stage where it is processed by oxidizing the carbon contained in the carbon glass melt to form carbon oxides. The oxidation of carbon may be performed pursuant to the chemical reactions identified above. The oxidizing step may also include the step of pouring the carbon glass melt into a rotating cone-shaped member which distributes the carbon glass melt above and about a second stage reactor wherein carbon is oxidized in the region above the second stage. The distribution may also be carried out by delivering the glass melt to a spinning disk which diverts a molten glass stream outwardly as glass filaments. The oxidation step may also be performed by injecting an oxidizer below the surface of the glass melt or by super-heating the glass melt to release oxygen from sodium or silica compounds in the melt.

According to another aspect of the invention, the method includes depositing glass constituents into a vessel, while stirring a glass melt in the vessel and heating the surface of the melt. Suitable heat sources may be air-fuel burners, oxygen-fuel burners or electric plasma. By stirring the glass melt, the super-heated glass is moved away from the heat source and mixed with colder glass constituents as new, cooler glass is exposed to the heat sources.

These and other objects and advantages of the present invention will be better understood in view of the attached drawings and detailed description of various embodiments and methods by which the present invention is practiced.

BRIEF DESCRIPTION OF DRAWINGS

FIG. 17 is a fragmentary cross-sectional view of an alternative embodiment of the mixer/melter.

FIG. 18 is a fragmentary cross-sectional view of an alternative embodiment of the mixer/melter.

FIG. 19 is a cross-sectional view of an alternative embodiment of the mixer/melter of the present invention.

FIG. 20 is a fragmentary cross-sectional view of an alternative embodiment of the mixer/melter of the present invention.

BEST MODE FOR CARRYING OUT INVENTION

Figure 1:
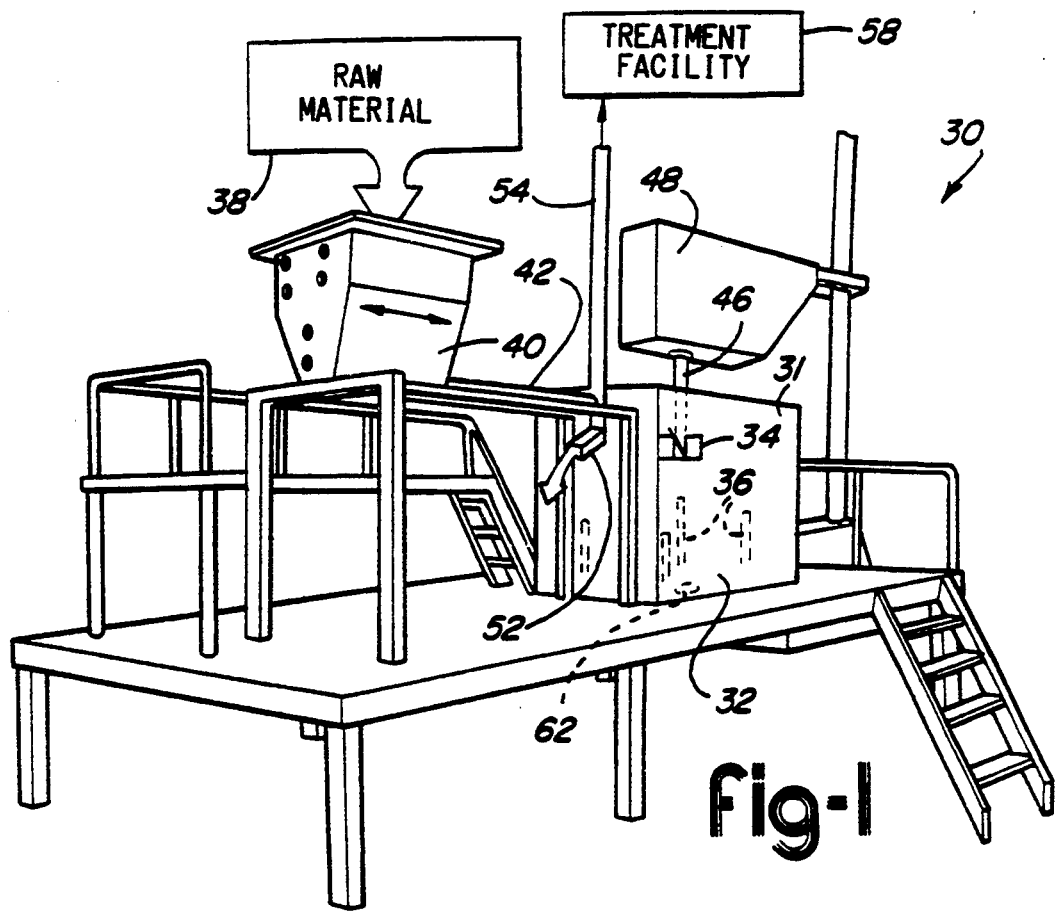
FIG. 1 is a perspective view of a mixer glass melter made according to the present invention.
Figure 2:
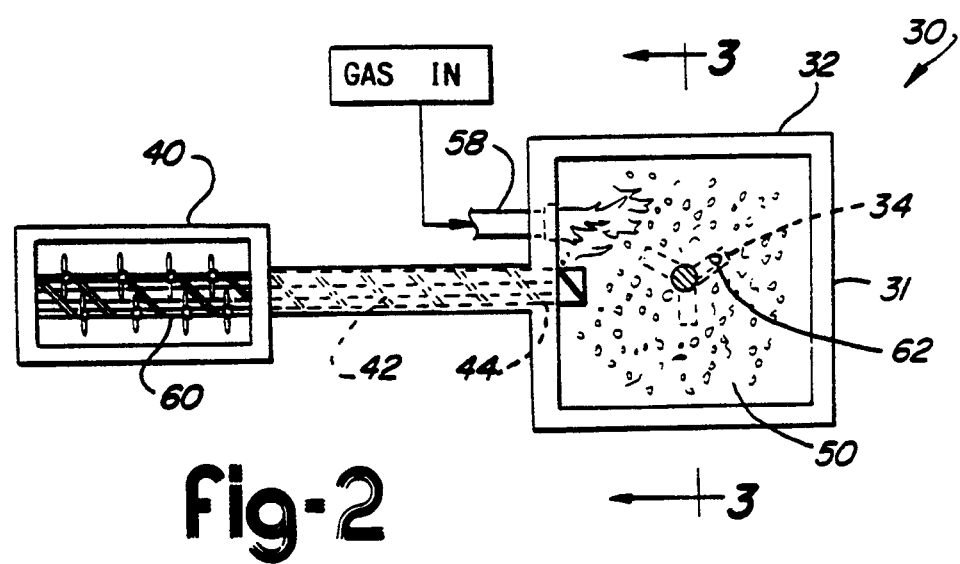
FIG. 2 is a fragmentary plan view of a mixer/melter shown in FIG. 1.

Referring now to FIGS. 1 and 2, one form of the melter apparatus 30 of the present invention is shown as a substantially complete system. A generally cube-shaped vessel 32 shown with an impeller 34 and electrodes 36 contained therein. Feed material 38 is provided to the melter apparatus 30 via a hopper 40.

Feed material 38 is moved from the hopper 40 to the vessel 32 by means of a screw conveyor 42. The screw conveyor 42 extends through an opening 44 in the vessel 32. The opening 44 is in the head space above the melt in the vessel.

The impeller 34 is connected by a shaft 46 to a drive motor 48. Referring more particularly to FIG. 2, the vessel 32 is used to contain a glass melt 50 while it is being heated by electrodes 36 which are preferably arrayed in the vessel 32 about the impeller 34. As feed material 38 is dispensed from the hopper 40 via the screw conveyor 42 it is added to the vessel through an opening 44 in the head space in the vessel 32 above the glass melt 50.

Referring to FIG. 1, an outlet port 52 is provided in vessel 32 to discharge a portion of the glass melt 50. An off-gas stack 54 removes gases through the outlet port 52 to a treatment facility 58 shown diagrammatically in FIG. 1.

An auxiliary gas burner 59 may be provided in vessel 32 above the glass melt. The auxiliary gas burner 59 provides supplemental heat for pre-heating feed material as it falls into the vessel and provides additional heat to the upper surface of the glass melt 50. If oxidation of the feed material 38 is desired an excess air burner may be used as the gas burner 59.

The hopper 40 may include a rotary feeder (60) to facilitate providing a continuous flow of feed material 38 through hopper 40.

The glass melt 50 is generally removed from the vessel 32 through outlet port 52, however, a drain (not shown) is provided in the bottom of the vessel 32 so that the vessel 32 may be completely emptied for servicing or for a shut-down as will be described more fully below.

Figure 3:
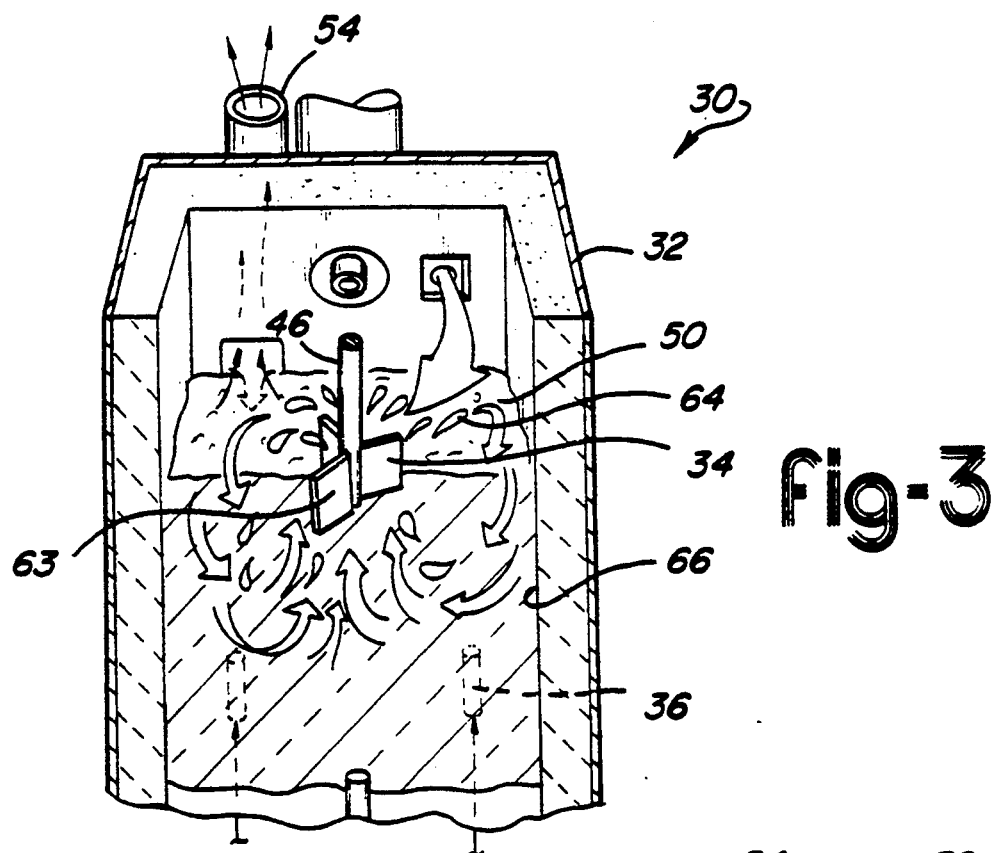
FIG. 3 is a cross-sectional view taken along line 3—3 in FIG. 2.

Referring now to FIG. 3, molter apparatus 30 is shown in a "sprinkler" mode wherein the impeller 34 is rotated rapidly above or adjacent to the top surface of the glass melt 50 so that drops 64 of the glass melt 50 are propelled outwardly above and along the surface of the melt. The drops 64 of the glass melt 50 are sprayed substantially tangentially outwardly toward the walls 66 of the vessel 32. Drops 64 contacting the wall 66 will run down wall 66 and return to the melt 50. Operation in the "sprinkler" mode offers several potential advantages including rapid incorporation of feed material 38 into the melt. Light-weight material such as fiberglass scrap or fly ash tends to float on the surface of the glass melt 50. By operating in the "sprinkler" mode, light-weight feed material 38 can be swamped or engulfed by the drops 64 as they are sprayed outwardly from the impeller 34.

As shown in FIG. 3, the blade 68 of the impeller 34 is preferably of no pitch or reverse pitch to raise or lift the drops 64 out of the glass melt 50 so that they become airborne. Another potential advantage of operating in a "sprinkler" mode, is that a controlled atmosphere maintained above the glass melt 50 for reacting chemically with the glass melt 50 can be encouraged to react by the increased surface area presented by the drops 64 of glass melt as they spread outwardly. For example, if an oxidizing atmosphere is maintained and carbon particles are found in the drops 64, the carbon will tend to oxidize from the drops 64 as they are exposed to the atmosphere above the glass melt 50. Alternatively, by maintaining a partial vacuum above the glass melt 50 vacuum de-gassing of the drops 64 may occur as they are propelled outwardly by the impeller 34.

Figure 4:
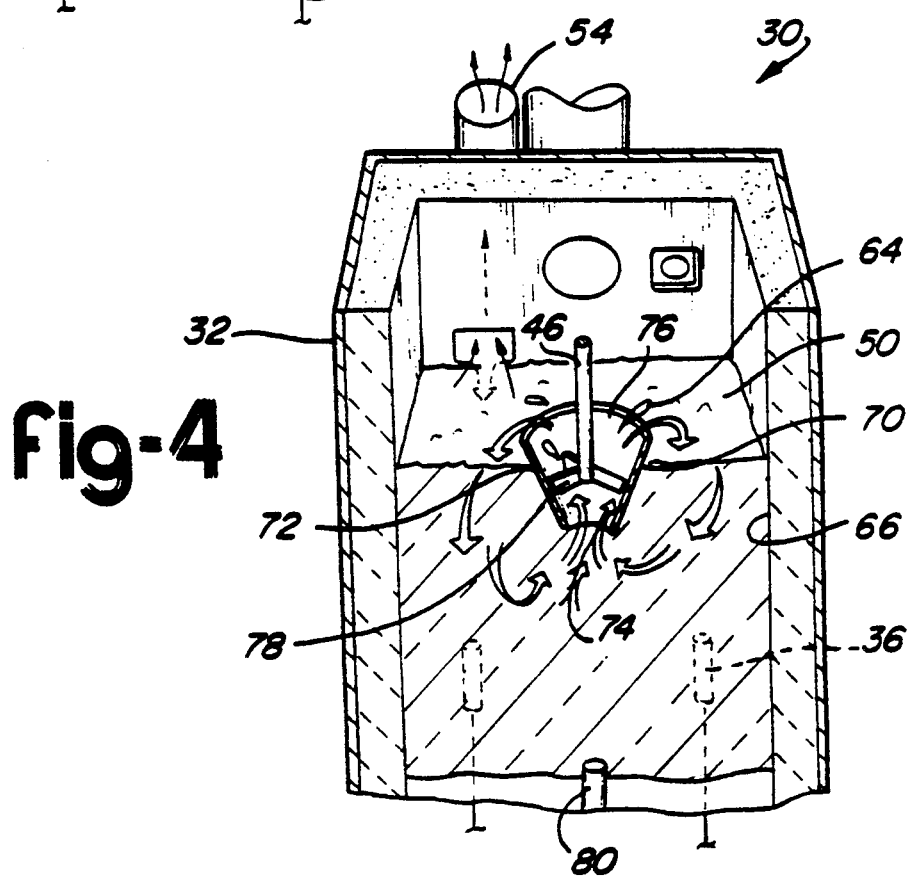
FIG. 4 is a cross-sectional view of an alternative embodiment of a mixer/melter.

Referring now to FIG. 4, an alternative embodiment is shown wherein a conical pump 70 is provided in place of the impeller 34. The conical pump 70 includes a frustoconical wall 72 having a lower opening 74 which is aligned with an axis of rotation and below an upper opening 76 which is also aligned with the axis of rotation of the conical pump 70. The frustoconical wall 72 is connected by spokes 78 to the shaft 46 to operate the conical pump 70 in a "sprinkler" mode, the smaller opening 74 is placed below the surface of the glass melt 50 with the upper opening 76 extending above the upper surface of the glass melt 50. As the conical pump 70 is rotated rapidly about the axis of rotation, glass entering the lower opening 74 tends to move, by centrifugal force, outwardly and upwardly along the frustoconical wall 72 until it exists the conical pump 70 at the upper opening 76. Upon exiting, filaments or drops 64 of the glass melt 50 are sprayed radially outwardly toward the wall 66. The conical pump 70 is expected to provide all the advantages of the impeller embodiment shown in FIG. 3 and may provide additional operational advantages.

A drain 80 is provided in the bottom of the vessel 32. The drain 80 may be fitted with a thermocouple 88 to provide temperature control.

Figures 5, 7:
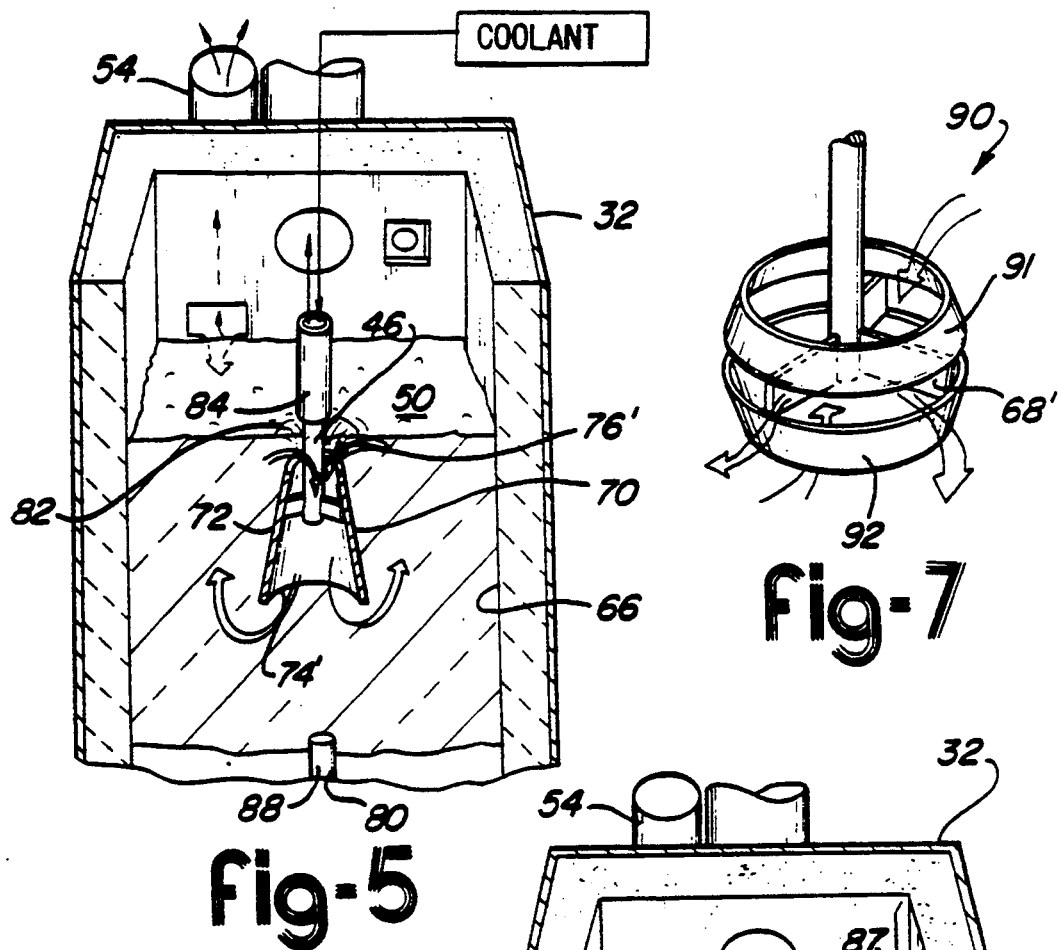
FIG. 5 is an alternative embodiment of the mixer/melter of the present invention.
FIG. 7 is a perspective view of an alternative embodiment of an impeller.

Referring now to FIG. 5, the conical pump 70 is shown operating as a centrifugal pump to draw the glass melt 50 downwardly through the conical pump 70. An upper opening 76' of the conical pump 70 is preferably located somewhat below the surface of the glass melt 50. The conical pump 70 includes a frustoconical wall 72 which forms a lower opening 74' and is located coaxially with and below the upper opening 76'. The lower opening 74' is larger than upper opening 76'. When the glass melt 50 enters the upper opening 76' it is driven downwardly and outwardly by centrifugal force toward and through the lower opening 74'. The conical pump 70, when oriented in this manner, forms a void in the upper surface of the glass melt 50 which is generally centered about the shaft 46. Any feed material 38 deposited on the surface of the glass melt 50 tends to be drawn down into the glass melt through the void.

Figures 6, 8:
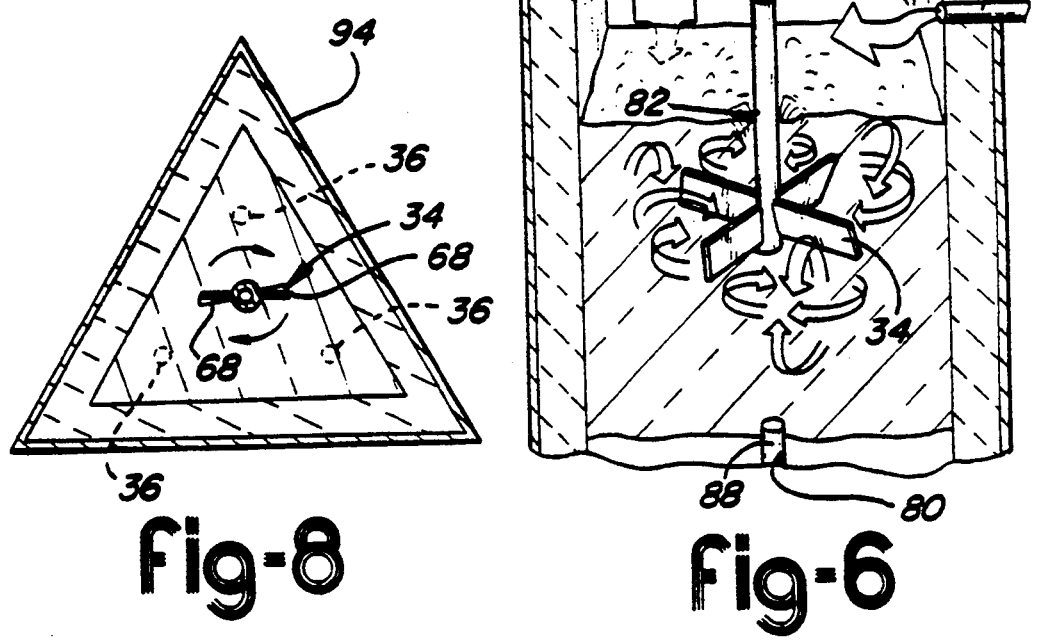
FIG. 6 is a cross-sectional view of an alternative embodiment of the mixer/melter of the present invention.
FIG. 8 is a schematic plan view of an alternative embodiment of a mixer/melter.

Referring to FIG. 6, a melter 30 is shown having a gas supply pipe 86 opening into a vessel 32. Oxygen, a reducing atmosphere, or inert gases may be supplied via the pipe 86 to maintain a controlled oxidation state in the head space 87 of the vessel 32.

If the impeller is formed of a metal (such as molybdenum) which may react with a gas (such as oxygen) contained in the head space 87 of the vessel 32, the vortex drawn by the impeller should not extend to the impeller. By limiting the depth of the vortex, degradation of the impeller by oxidation can be avoided. At temperatures in excess of 1,200° F., molybdenum degrades rapidly in the presence of oxidizers. Under these conditions, the glass melt functions as shield to prevent corrosion of the impeller.

Referring now to FIG. 7, an alternative embodiment of the impeller is shown which shall be referred to as a "shrouded impeller" 90. Shrouded impeller 90 has a plurality of blades 68' which are bounded on their upper and lower edges by upper and lower cone sections 91 and 92, respectively. The primary advantage of the shrouded impeller 90 is that it reduces the power current density at the tips of the blades 68'. If the blade is included as an electrode in the power circuit or even if the impeller extends close to the electrodes, a situation is presented in which the shrouded electrode 90 may offer an attractive alternative. The continuous outer edge of the cone sections reduces current fluctuations caused by movement of the blades relative to the electrodes. The cone sections 91 and 92 also reinforce the blades structurally which improves durability.

Referring now to FIG. 8, an alternative embodiment of a vessel 32 wherein a triangular vessel 94 is shown. A triangular vessel may include three electrodes 36 located in the region of the three corners of the triangular vessel 94. If a three electrode 36 array is provided, a preferred impeller 34 would include two blades 68. By providing two or four blades and three electrodes 36, a three phase power supply can be provided since the two blades 68 of the impeller 34 never align with any two electrodes 36.

Figure 9:
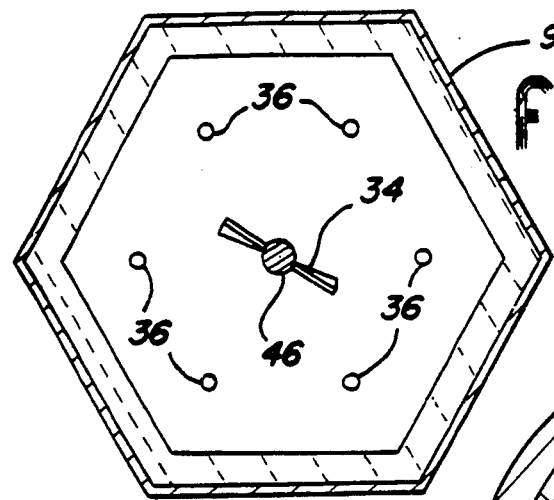
FIG. 9 is a schematic plan view of an alternative embodiment of the mixer/melter.

Referring now to FIG. 9, a hexagonal vessel 96 is shown wherein six electrodes 36 are arrayed about the impeller 34. The electrodes are spaced equidistant from the axis X of the shaft 46 on which the impeller 34 is mounted. The impeller 34 preferably includes two blades. The electrical circuit used is preferably a three phase circuit in which diametrically opposed electrodes are of the same phase so that when the two blades of the impeller align with any two electrodes, there is diminimus relative voltage potential difference between them. In this way, the impeller is effectively eliminated from the electrical circuit. The impeller 34 is electrically isolated and should not be grounded.

Figure 10:
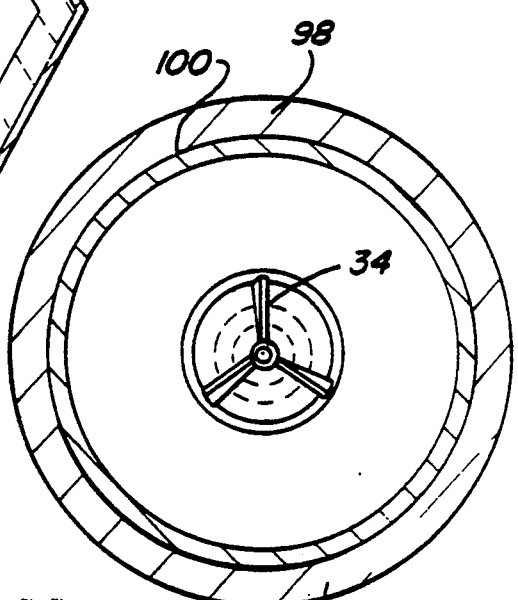
FIG. 10 is a schematic plan view of an alternative embodiment of the mixer/melter.

Referring now to FIG. 10, a cylindrical vessel 98 is shown. The cylindrical vessel is preferably connected in a single phase electrical circuit. The cylindrical vessel 98 preferably has a metal liner 100 which is surrounded by a layer of insulation 102. The electrical circuit is preferably a single phase electrical circuit with the impeller acting as one electrode and the metal liner 100 being connected to ground so that Joule-effect heating occurs between the impeller 34 and the liner 100. The impeller shown in FIG. 10 is a shrouded impeller such as one shown in FIG. 7 above.

Figure 11:
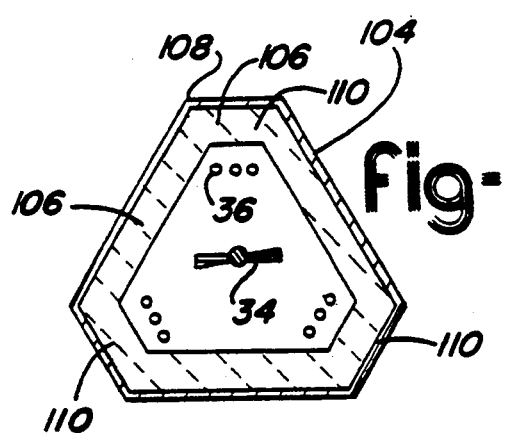
FIG. 11 is a schematic plan view of an alternative embodiment of the mixer/melter.

Referring now to FIG. 11, a truncated equilateral triangle shaped vessel 104 is shown. The vessel includes a refractory liner 106 and a metal shell 108. The truncated equilateral shaped vessel 104 lends itself to use in a three phase circuit wherein one or more electrodes of the same phase are positioned in the region of the truncated corners 110 of the vessel 104. As shown in FIG. 11, three electrodes of the same phase are located in each of the corners 110. The purpose of providing multiple electrodes in each corner is to increase the surface area of electrodes available thereby minimizing the charge concentration.

Figure 12:
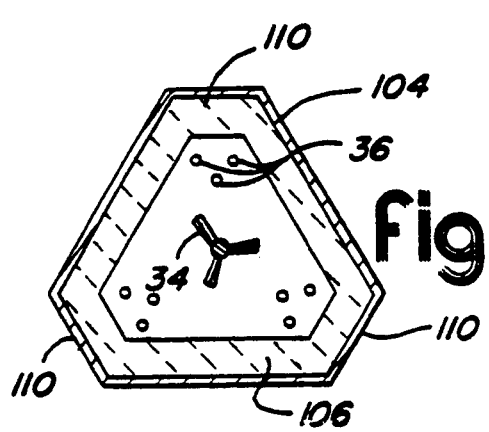
FIG. 12 is a schematic plan view of an alternative embodiment of the mixer/melter.

Referring to FIG. 12, an alternative embodiment is a truncated equilateral triangle shaped vessel 104 is shown wherein three phase power is provided to the vessel with an electrode for each phase being located in the region of each truncated corner 110. This arrangement lends itself to applications where high resistance glass is melted. A hot spot is created adjacent to each corner 110 between the electrodes 36. The impeller circulates molten glass in the vessel to distribute heat within the vessel 104.

In FIG. 12, a three bladed impeller may be used even though the electrodes 36 are arranged in three groups since the impeller in this configuration is essentially out of the circuit due to the high concentration of flux between the electrodes in each corner. A three bladed impeller is advantageous because a three bladed impeller is more mechanically stable than a two bladed impeller.

Figure 13:
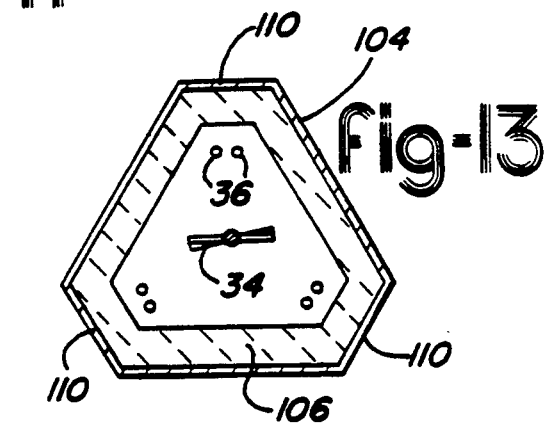
FIG. 13 is a schematic plan view of an alternative embodiment of the mixer/melter.

Referring now to FIG. 13, another embodiment showing the use of a truncated equilateral vessel 104 is shown wherein six electrodes are provided with two electrodes being located in each of the truncated corners 110. This arrangement lends itself to use in a three phase circuit or in a single phase circuit. If three phase power is provided, electrodes 36 in each truncated corner 110 would preferably be of different phase. If single phase power is provided opposite polarity electrodes would be provided in each truncated corner 110. In either embodiment, hot spots are created in each corner. The impeller 34 has two blades 68 to minimize transmission of current through the impeller to the other truncated corners.

Figure 14:
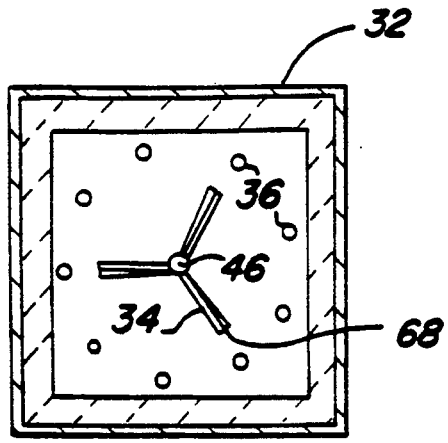
FIG. 14 is a schematic plan view of an alternative embodiment of the mixer/melter.

Referring now to FIG. 14, another alternative embodiment is shown wherein a square vessel 32 such as that shown in FIG. 1 is provided. Nine electrodes are shown arrayed in a generally circular arrangement about the axis of rotation X of the shaft 46. The nine electrodes are connected to a three phase power circuit with the three phases being alternated sequentially about the circumference of the circle on which the electrodes 36 are placed. A three bladed impeller 34 is provided which offers good fluid flow and stability. The unique advantage of this arrangement is that when the blades 68 of the impeller 34 pass an electrode, the tips of the blades point towards electrodes of the same phase. In this way the impeller 34 is effectively removed from the circuit as the impeller is not connected to ground or the electric circuit. Heating takes place around the electrodes in a generally circular pattern and the impeller mixes the glass melt 50 to distribute heat throughout the glass melt 50.

Figure 15:
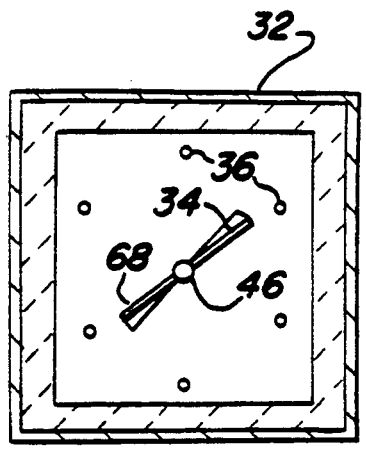
FIG. 15 is a schematic plan view of an alternative embodiment of the mixer/melter.

Referring now to FIG. 15, the vessel 32 is provided with six electrodes and includes an impeller 34 having two blades 68. Three phase power is provided to the electrodes which are again arrayed about the axis X of rotation of the shaft 46 with the phases of diametrically opposed electrodes being identical. The impeller is effectively removed from the circuit and there is little tendency for current to be conducted through the impeller which is not grounded and is isolated from the electrical circuit. In FIGS. 14 and 15, the vessel 32 preferably has a refractory lining and a metal shell as previously described.

Figure 16:
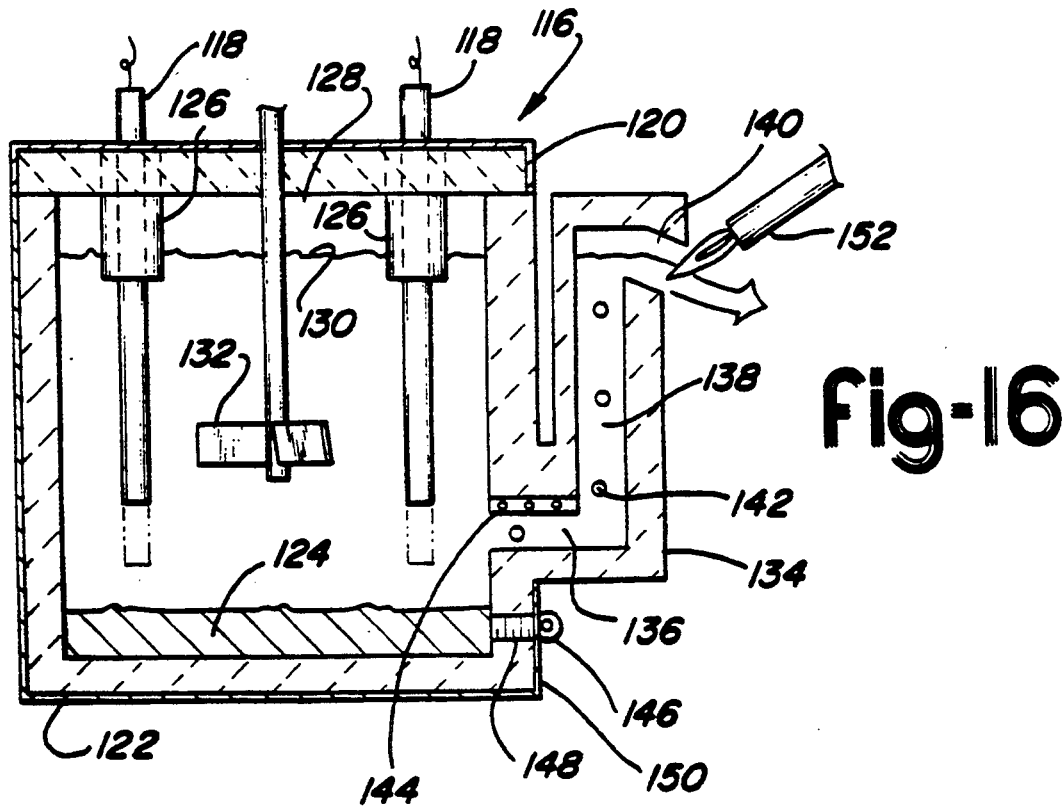
FIG. 16 is a cross-sectional view of an alternative embodiment of the mixer/melter of the present invention.

Referring now to FIG. 16, a top down electrode vessel 116 is shown. Electrodes 118 extend through and are mounted in the cover 120 of the vessel 122. The top down melter 116 can be used to process a glass melt in which metal precipitates tend to accumulate in the bottom of the vessel 116. If electrodes extend from the bottom of a vessel 32 and metallic residue accumulates adjacent to the bases the electrodes a conduction path will be created between electrodes through the accumulated metal residue 124. Water cooled electrode holders 126 may be provided to shield the electrodes from the atmosphere in the head space 128 of the vessel above the level of the melt 130 and below the cover 120. If molybdenum electrodes 118 are used exposure to oxidizers in the head space 128 would result in unacceptable erosion of the electrodes 118. The water cooled electrode holders 126 shield the molybdenum from erosion and extend slightly into the glass melt. The glass melt 130 shields the electrodes 118 below the surface of the glass melt 130. An impeller 132 is provided in the center of the melter 116. The impeller 132 shown in FIG. 16 is a three bladed impeller which mixes the glass melt 130 as it heated by the electrodes 118.

The glass melt is removed from the vessel through a "teapot spout" 134. The teapot spout includes a throat portion 136 which extends horizontally from a lower portion of the vessel 122. A riser 138 extends vertically from the throat 136 to the spout opening 140. As the level of the glass melt 130 in the vessel 122 exceeds the level of the opening 140, the glass melt 130 overflows from the spout. A plurality of electrodes 142 are provided in the throat 136 and riser 138 to keep the glass melt 130 from blocking the teapot spout 134 which would occur if the glass melt is permitted to cool. A water cooled shield 144 is provided above the throat 136 to protect the vessel 122 in the region above the throat 136. A drain plug 146 is shown in a tab hole 148 adjacent to the base 150 of the vessel 122. Accumulated metal residues of various waste streams may be accumulated at the base of the vessel 122 and periodically poured off through the tap hole 148 by removal of the drain plug 146. By this technique heavy phases, some of which may be valuable, may be removed from the molter 116. A gas burner 152 is preferably provided at the opening 140 to keep the glass freely flowing as it enters the opening 140.

Referring now to FIG. 17, another alternative vessel 154 is shown wherein electrodes 156 extend through side walls 158 of the vessel. A drain plug 160 is placed in a tap hole 162 adjacent to the bottom 164 of the vessel 154. The impeller 166 is shown aligned in height with the electrodes 156. It is anticipated that the impeller may be raised or lowered relative to the level of the electrodes 166. The tap hole 164 is provided to allow draining of heavy phases which may accumulate in the bottom 164 of the vessel 154. The impeller 166 mixes the glass melt 168 to circulate the glass melt in the vessel 154 and thereby distribute the heated portion of the glass melt.

Referring now to FIG. 18, another alternative is shown wherein a vessel 170 having horizontally extending electrodes 172 extending from a side wall 174 close to an adjacent side wall 176 of the vessel 170. The horizontal electrodes 172 allow for accumulation of metals in the bottom of the vessel 170 and present increased surface area as compared to the side wall electrode embodiment of FIG. 17. The impeller 178 is a shrouded impeller having a cylindrical wall. The shrouded impeller minimizes voltage differential fluctuations caused by rotation of the impeller 178.

Referring now to FIG. 19, an oxidation reaction melter 180 is shown wherein a vessel 182 is provided in which a glass melt 184 is mixed by an impeller 186. The glass melt 184 is heated by side wall electrodes. The electrodes shown are tin oxide electrodes, or similar material, which is formed as block shaped electrodes protruding only slightly from the side walls 190 of the vessel 182.

Also shown in FIG. 19 are oxidizer injector tubes 192. Oxygen, air, steam or other oxidizers may be supplied to the glass melt below the surface of the glass melt 184. Oxygen added below the surface of the glass melt 184 will react with constituents of the glass melt 184 which are able to be oxidized. A water cooled or oxidation resistant impeller 186 mixes the glass melt 184. In addition, oxidizer injected below the surface of the glass melt 184 also causes vigorous mixing of the glass melt 184. In some situations the impeller 186 may be eliminated from the vessel 182 and mixing can be caused solely by injection of the oxidizers or other gases through the oxidizer injectors 192. A drain opening 194 is shown in the base 196 of the vessel 182. The opening 194 would be capped by a drain plug (net shown) as previously described. The oxidation reaction molter 180 could be used as a primary glass melter or it could be used as a second stage in series with a mixer/molter as previously described. The vessel 182 includes an inlet 196 through which molten glass is received from a prior mixer/molter operation. Alternatively, the inlet 196 could be used to receive glass constituents, ,waste material for vitrification or other feed stocks in a dry, slurry, or other form.

Referring now to FIG. 20, an alternative oxidation reaction vessel 198 is shown. The oxidation reaction vessel 198 features an oxidizer injector 199 which is mounted in a base 200. The oxidizer injector 199 could be used in combination with an impeller or various electrode combinations as previously described. Alternatively, the oxidizer injector 199 could be used in a conventional gas burner heated melter tank as a second stage to a mixer/melter as described herein.

Figure 21:
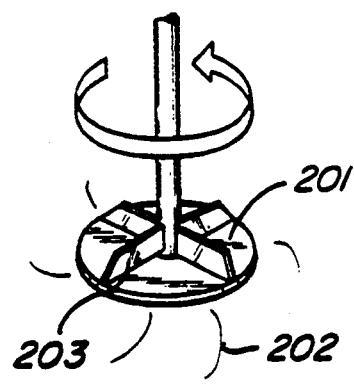
FIG. 21 is a prospective view of a second stage molten glass spinner.

Referring now to FIG. 21, a spinning disk 201 is shown which may be used in a second stage reactor to direct a molten glass stream supplied to a second stage reactor outwardly as glass filaments 202. For example, carbon contaminants can be oxidized if an oxidizing atmosphere is maintained above the glass melt in the second stage reactor. The spinning disk 201 preferably has a plurality of ribs 203 to drive the molten glass stream radially.

Figure 22:
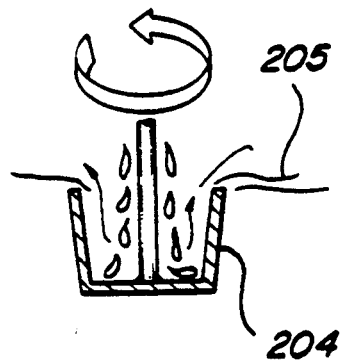
FIG. 22 is a cross-sectional view of an alternative embodiment of a second stage molten glass spinner cup.

As shown in FIG. 22, a rotating cup 204 can be used to form glass filaments 205 in a second stage vessel by pouring molten glass from a first vessel into the rapidly rotating cup 204.

Figure 23:
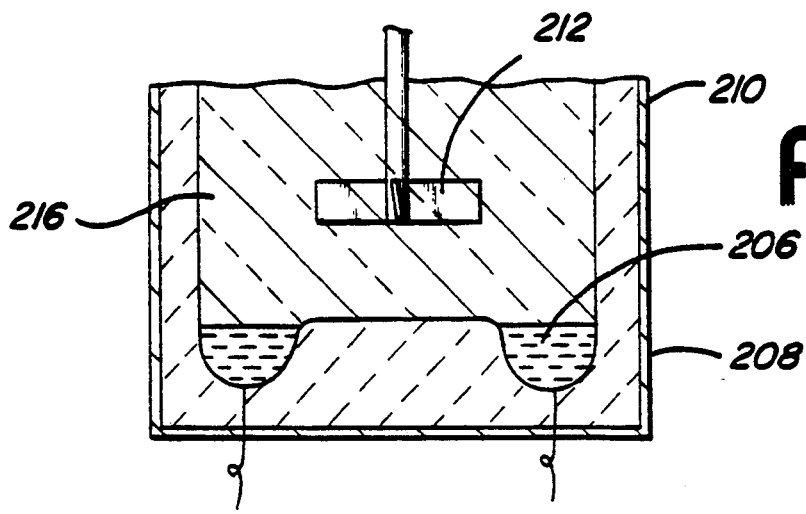
FIG. 23 is a fragmentary cross-sectional view of an alternative embodiment of the mixer/melter of the present invention.

In FIG. 23, an alternative embodiment is shown which features a plurality of liquid metal electrodes 206 located in the base 208 of the vessel 210. The vessel has an impeller 212 which stirs the glass melt 216 while current is supplied to the liquid metal electrodes 206 to heat the melt 216 above and between the electrodes 206 by Joule effect heating.

Figure 24:
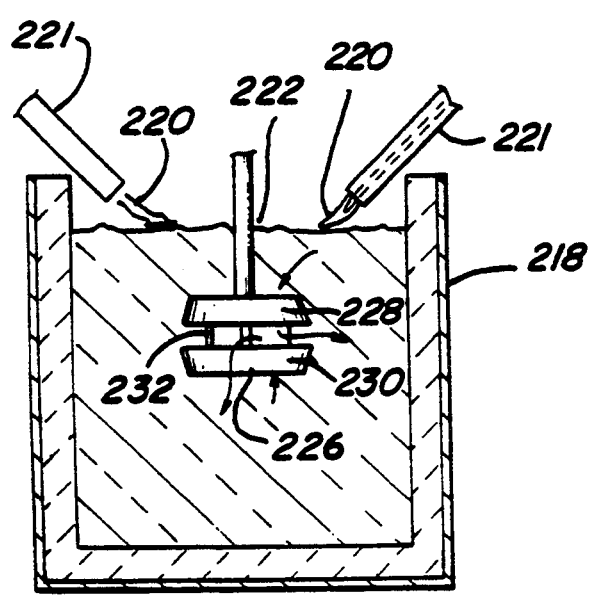
FIG. 24 is a cross-sectional view of an alternative embodiment of the mixer/melter of the present invention.

Referring now to FIG. 24, an alternative glass melter 218 is shown wherein a plasma 220 directed by heaters 221 at the surface of the glass melt 222. Alternatively, the heaters 221 can be plasma, arc or oxygen fuel burners which provide an intense energy source. Intense heating of the glass melt occurs at the

I claim:

1. A method of recycling coated mineral fibers having an organic coating comprising the steps of:
    depositing coated mineral fibers into a vessel containing a molten glass bath;
    stirring the molten glass bath at a speed sufficient to create a surface currents which convey the coated mineral fibers along with the surface currents;
    heating the coated mineral fibers while being conveyed by the surface currents to decompose said organic coating on the mineral fibers leaving a residue and mineral fibers, said residue comprising carbon;
    oxidizing a first portion of said residue as said mineral fibers are conveyed by said surface currents across a portion of the surface of said molten glass bath;
    dispersing the mineral fibers and a second portion of the residue into the molten glass bath with a stirrer rotating at a speed sufficient to make a mineral fiber and residue dispersion in the molten glass bath; and
    heating the mineral fiber and residue dispersion to melt the mineral fibers with said second portion of said residue to create a carbon/glass melt as carbon from said second portion of residue is released into said molten glass bath.

2. The method of claim 1 further comprising the step of oxidizing said carbon in carbon/glass melt by combining the carbon in said carbon/glass melt with an oxidizer to form carbon oxides.

3. The method of claim 2 wherein said oxidizing step comprises the following reaction:

$$C+O_2 \rightarrow CO_x$$

4. The method of claim 2 wherein said oxidizing step comprises the following reaction:

$$Na_2O+C \rightarrow CO_x+Na$$

5. The method of claim 2 wherein said oxidizing step comprises the following reaction:

$$C+SiO_2 \rightarrow CO+SiO$$

6. The method of claim 2 wherein said oxidizing step comprises the following reaction:

$$C+H_2O \rightarrow CO+H_2$$

7. The method of claim 2 wherein said oxidizing step is carried out in a second stage remote from said vessel in which said depositing, stirring and heating steps are performed.

8. The method of claim 7 wherein said oxidizing step further comprises pouring said portion of said carbon containing molten glass bath into a rotating disc which distributes said portion of said contaminated glass bath above and about said second stage wherein carbon is oxidized by an oxidizer in the region above said second stage.

9. The method of claim 7 wherein said oxidizing step further comprises pouring said portion of said carbon containing molten glass bath into a rotating cone-shaped member which distributes said portion of said contaminated glass bath above and about said second stage wherein carbon is oxidized by an oxidizer in the region above said second stage.

10. The method of claim 2 wherein said oxidizing step further comprises supplying an oxidizer into the molten glass bath to oxidize said carbon.

11. The method of claim 2 wherein said oxidizing step further comprises heating said molten glass bath to a temperature greater than 2,500° F. at which point carbon reacts with sodium compounds in said molten glass bath to form gases.

12. The method of claim 2 wherein said oxidizing step further comprises heating said molten glass bath to a temperature greater than 2,650° F. at which point carbon reacts with silicon compounds in said molten glass bath which combines with said carbon contaminates.

13. The method of claim 1 further comprising the step of supplying the portion of said molten glass bath to a mineral glass fiber forming operation after removal of substantially all of said carbon contaminates therefrom whereby said mineral fibers are recycled into mineral glass fibers.

* * * * *